United States Patent [19]

Blaser et al.

[11] Patent Number: 5,182,114
[45] Date of Patent: Jan. 26, 1993

[54] SUGAR COMPOSITIONS WITH MOLASSES-CONTAINING FRACTION OF CANE SUGAR AS A SOURCE OF FLUORIDE ION

[75] Inventors: Eric Blaser, Toronto, Canada; Albert Zumbé, Neuchatel, Switzerland

[73] Assignee: Jacobs Suchard AG, Zurich, Switzerland

[21] Appl. No.: 615,842

[22] Filed: Nov. 20, 1990

[51] Int. Cl.$^5$ ............................................. A01N 59/10
[52] U.S. Cl. ........................................ 424/673; 424/674; 424/675; 424/676; 424/440; 424/195.1; 426/74; 426/648; 426/658; 426/660
[58] Field of Search ............... 424/673, 674, 675, 676, 424/440, 195.1; 426/660, 658, 74, 648; 127/29, 30, 33

[56] References Cited

U.S. PATENT DOCUMENTS

| | | | |
|---|---|---|---|
| 2,030,461 | 2/1936 | Moss | 99/11 |
| 2,243,381 | 5/1941 | Klopfer | 99/140 |
| 2,904,438 | 9/1959 | O'Rourke | 99/24 |
| 4,107,347 | 8/1978 | Burley | 426/660 |
| 4,228,150 | 10/1980 | Robyt et al. | 424/48 |
| 4,405,600 | 9/1983 | Besic | 424/57 |
| 4,665,025 | 5/1987 | Weidenbach et al. | 435/94 |
| 4,695,326 | 9/1987 | Takazoe et al. | 217/30 |

FOREIGN PATENT DOCUMENTS

| | | | |
|---|---|---|---|
| 1013756 | 8/1952 | France | 424/676 |
| 1355745 | 6/1974 | United Kingdom | 424/676 |

OTHER PUBLICATIONS

The New Encyclopedia Britannica, vol. 2, Micropaedia, 1986, p. 800.
Luoma et al. "Effect on caries in mentally handicapped children of addition of fluoride . . . ", Scand. J. Dent. Res. vol. 87(3), 1979, pp. 197-207.
Luoma "Fluoride, magnesium and dental caries current aspects" Proc. Finn. Dent. Soc. (1986), vol. 82, pp. 290-297.
Nikiforuk, G. "Fluoride and Dental Health" Can. Fam. Physician vol. 34: Jun. 1988 pp. 1333-1336.
Nizel, Abraham E. "Nutrition in Preventative Dentistry Science and Practice" Second Edition, 1981, W. B. Saunders Company, pp. 268, 269, 278, 279, 284.
Nikiforuk, G. "Understanding Dental Caries" Karger, 1985, pp. 56, 57, 216-222.
Lopez H. et al "A Method of Assay Fluoride in Foods, Beverages, and Diets" Caries Res. 1988; 22: pp. 210-216.

Primary Examiner—Richard L. Raymond
Assistant Examiner—John D. Pak
Attorney, Agent, or Firm—Dickinson, Wright, Moon, Van Dusen & Freeman

[57] ABSTRACT

Non-cariogenic sugar composition comprising 2 to 10 ppm fluoride, and preferably 50 to 400 mg/100 g each of calcium ion and phosphate (calculated as P) and 5 to 50 mg/100 g magnesium. The composition is made by blending a composition deficient in fluoride ion with a composition superabundant in fluoride ion, preferably obtained by selection of a superabundant fluoride ion containing fraction of cane sugar containing molasses, such as raw cane sugar, molasses, affination syrup, dried solids of molasses or of affination syrup or a blend thereof with refined sugar, or by evaporation of a mineral water to obtain a concentrate.

14 Claims, 3 Drawing Sheets

SUGAR COMPOSITIONS WITH MOLASSES-CONTAINING FRACTION OF CANE SUGAR AS A SOURCE OF FLUORIDE ION

BACKGROUND OF THE INVENTION

Tooth decay (dental caries) is one of mans most common diseases. It is now well established that diet plays a central role in the development of dental caries. Numerous studies involving man, animals and laboratory investigations have clearly shown a relationship between a frequent consumption of fermentable carbohydrates, particularly sucrose, and the high prevalence of dental caries. Because sucrose is the sugar eaten most often and in the greatest quantity it is regarded as uniquely associated with dental caries. This, also, suggests that sugar confectionery compositions, which usually contain high concentrations of sucrose, and conventional chocolate compositions, which usually contain up to about 50% sucrose, are suspected to increase the prevalence of dental caries.

Dental caries is a multifactorial disease resulting from the action of oral bacteria on a suitable carbohydrate substrate producing acidic products which cause loss of minerals (demineralization) of dental enamel. If demineralization continues and calcium and phosphate diffuse out of the tooth into the oral environment then visible decay occurs and eventually a cavity forms. This process may be arrested and even reversed in the presence of fluoride along with calcium and phosphates. This is called remineralization. In simple terms the tooth decay equation is as follows:

| Plaque | | Fermentable | | Organic |
|---|---|---|---|---|
| | + | | → | |
| Bacteria | | Carbohydrates | | Acids |
| Organic | | Tooth | | |
| | + | | → | |
| Acids | | Mineral | | Demineralization |

Initiation of caries usually involves dental enamel. Some lesions may start in exposed dentin and cementum. The mineral part of enamel, dentin and cementum consists mainly of a calcium-phosphate-carbonate phase with the inclusion of smaller concentrations of trace elements the most significant of which is fluorine. The crystalline structure of enamel is similar to a mineral called hydroxyapatite, $Ca_{10}(PO_4)_6(OH)_2$, which is highly susceptible to acid demineralization.

Oral aciduric bacteria especially Streptococcus Mutans, metabolize suitable substrate such as sucrose, glucose, fructose, maltose, or other fermentable carbohydrates producing acidic metabolites. The main organic acids formed are lactic, formic, propionic, and acetic. As a result the pH of bacterial dental plaque on dental tissue may drop to a level that causes loss of mineral salts from enamel. Pathogenic bacteria enter the porous demineralized areas and the cycle of formation of carious lesions continues.

It is known that administration of fluoride calcium, phosphorus and magnesium can effectively reduce the prevalence of dental caries. These minerals may be applied systemically or topically. The main source of systemic fluoride is ingestion of foods which naturally contain some fluoride ion, from ingestion of fluoride-containing supplements, and from drinking fluoridated water. Systemic administration of fluoride results in uptake of fluoride by the tooth through the pulp and other blood supply sources. Fluoride in enamel is known to limit demineralization of the tooth enamel and to promote its remineralization into a stable fluorapatite crystal structure corresponding generally to the formula $Ca_{10}(PO_4)_6F_2$ which exhibits greater caries resistance. However, some jurisdictions do not permit fluoridation of water supplies and in any event many individuals susceptible to dental caries, especially young children, do not drink sufficient volumes of fluoridated water on a daily basis to afford an adequate fluoride dosage. Fluoride ingested in food provides variable and usually inadequate dosages, while the use of fluoride containing supplements should desirably be permitted only under professional care to avoid problems of under dosage or over dosage resulting in fluorosis.

Local or topical application of fluoride may be achieved by application of fluoride containing gels or solutions and by use of fluoride containing dentifrices. However, topical application of fluoride has been considered to result primarily in a $CaF_2$ precipitate that leaches away readily and results in only a small secondary production of fluorapatite. To be effective, topical fluorides have to be frequently applied as in the use of fluoridated dentifrices. Optimal benefits from fluoride accrue when systemic fluorides, e.g. from ingesting fluoridated water, are combined with the use of topical fluorides as when using fluoridated dentifrices.

Even though there has been considerable reduction of tooth decay generally in western countries over the last 25 years, the occurrence of root caries is still a significant problem among dentate adults in western countries. In Third World countries tooth decay remains a general problem. Accordingly there exists a need for an effective means of preventing or significantly reducing the prevalence of dental caries among consumers of sucrose and other fermentable sugars, sugar confectionery, and chocolate.

SUMMARY OF THE INVENTION

The invention primarily resides in the surprising finding that various unrefined and partly refined fractions that contain molasses and are obtained from the refining of cane sugar frequently contain elevated contents of fluoride ion. By analysis of batches of such fractions, therefore, it is possible to identify those batches which contain elevated fluoride ion contents. The content of fluoride ion is variable and is usually unpredictable from batch to batch, whereas at least for the purposes of manufacture of food products including confectionery and chocolate it is of course important to provide sugar compositions which are of uniform, controlled fluoride content so that problems of under dosage or over dosage of fluoride ion are avoided. This method, for making a non-cariogenic sugar composition having a predetermined content of fluoride ion in the range of 2 to about 10 ppm, comprises blending a molasses-containing fraction of cane sugar, which is naturally superabundant in fluoride ion as compared with said predetermined content, with a starting material sugar composition naturally deficient in fluoride ion as compared with said predetermined content, to obtain a blend having said predetermined content. As with the blend described above, this natural blend may be considered made from natural ingredients and may be saleable generally as a food product as may also products such as confectionery and chocolate made using the blend as an ingredient.

Secondarily, the invention resides in the surprising finding that exposure of teeth to cariogenic challenge from bacteria and a fermentable sugar in the presence of certain amounts of free fluoride (fluoride ion), preferably also together with certain amounts of calcium, phosphate and magnesium ion, inhibits the initial demineralization of the tooth enamel that is observed when fluoride is absent. Sugar compositions containing appropriate concentrations of these ions when fermented in proximity with the teeth therefore exhibit no tendency toward caries-forming attack on the teeth. Moreover, such compositions surprisingly have been found capable of causing effective remineralization of enamel to yield caries-resistant fluorapatite structures. Before the present invention, it has been suggested that topical application of fluoride should not be performed in association with consumption of food or drink, on the basis that eating or drinking tends to speed up clearance of fluoride from the mouth and therefore it has been suggested that eating or drinking should be postponed as much as possible after topical application of fluoride. Moreover, as mentioned above, it has been considered that topical fluoride ion application results in only relatively poor remineralization of the tooth enamel. Based on the current understanding of the chemical and physical processes involving dental caries the following mechanisms best explain the advantageous results obtained from the use of the proposed non-cariogenic sucrose preparations. Firstly it is believed there is enhancement of remineralization by fluoride and other minerals which speeds-up recrystallization. This provides a more acid resistant new fluorapatite crystal surface. Remineralization following demineralization makes the tooth more resistant to dental caries.

Secondly, protection of enamel surfaces against demineralization occurs through calcium, magnesium and phosphate ions, when present, by the common ion effect. Although the mechanism by which the surprisingly advantageous results are achieved with the above mentioned compositions is not presently fully understood, without wishing to be bound by any theory it is suggested that the acidic metabolites formed from the fermentable sugars serve to temporarily etch the surface of the enamel making it temporarily more pervious to the passage of the remineralizing fluoride and other ions, and as a result a more effective remineralization of the tooth is obtained.

Accordingly, in a further aspect, the invention provides novel non-cariogenic sugar compositions containing fluoride and preferably also calcium, phosphate and magnesium ions which inhibit demineralization and enhance remineralization of enamel. Such compositions may be consumed directly or preferably are used in the manufacture of novel non-cariogenic confectionery and chocolate compositions.

Such non-cariogenic sugar compositions may, of course, be made in the manner described above by blending fluoride-deficient sugar compositions with molasses containing fractions superabundant in fluoride ion to achieve predetermined fluoride ion contents. Such compositions may also be made in accordance with a further aspect of the present invention by blending known sugar compositions deficient in fluoride and the above mentioned ions with additives, namely fluorides, and preferably also calcium and magnesium salts and phosphates. In many jurisdictions, however, food and drug statutes or regulations prohibit such additives in substances sold generally as food.

In a still further aspect, the invention provides a method of making the above-mentioned noncariogenic compositions containing a predetermined content of fluoride ion from natural sources. This method comprises evaporating natural mineral water having a content of fluoride ion, to form a concentrate having a content of fluoride ion which is superabundant as compared with said predetermined content. The concentrate is then blended with a sugar composition which is deficient in fluoride ion, as compared with said predetermined content, in an amount which yields a blend having the required, predetermined fluoride content. The term "mineral water" is used herein in its usual sense as meaning water naturally impregnated with mineral salts, anions and cations, and usually of subterranean origin.

Since the blend is obtained from natural sources it may comply with food and drug regulations and may be saleable in some jurisdictions generally as a food ingredient. Further, products such as confectionery and chocolate made using the blend may likewise be saleable generally as food.

DETAILED DESCRIPTION OF THE INVENTION

Figure 1:
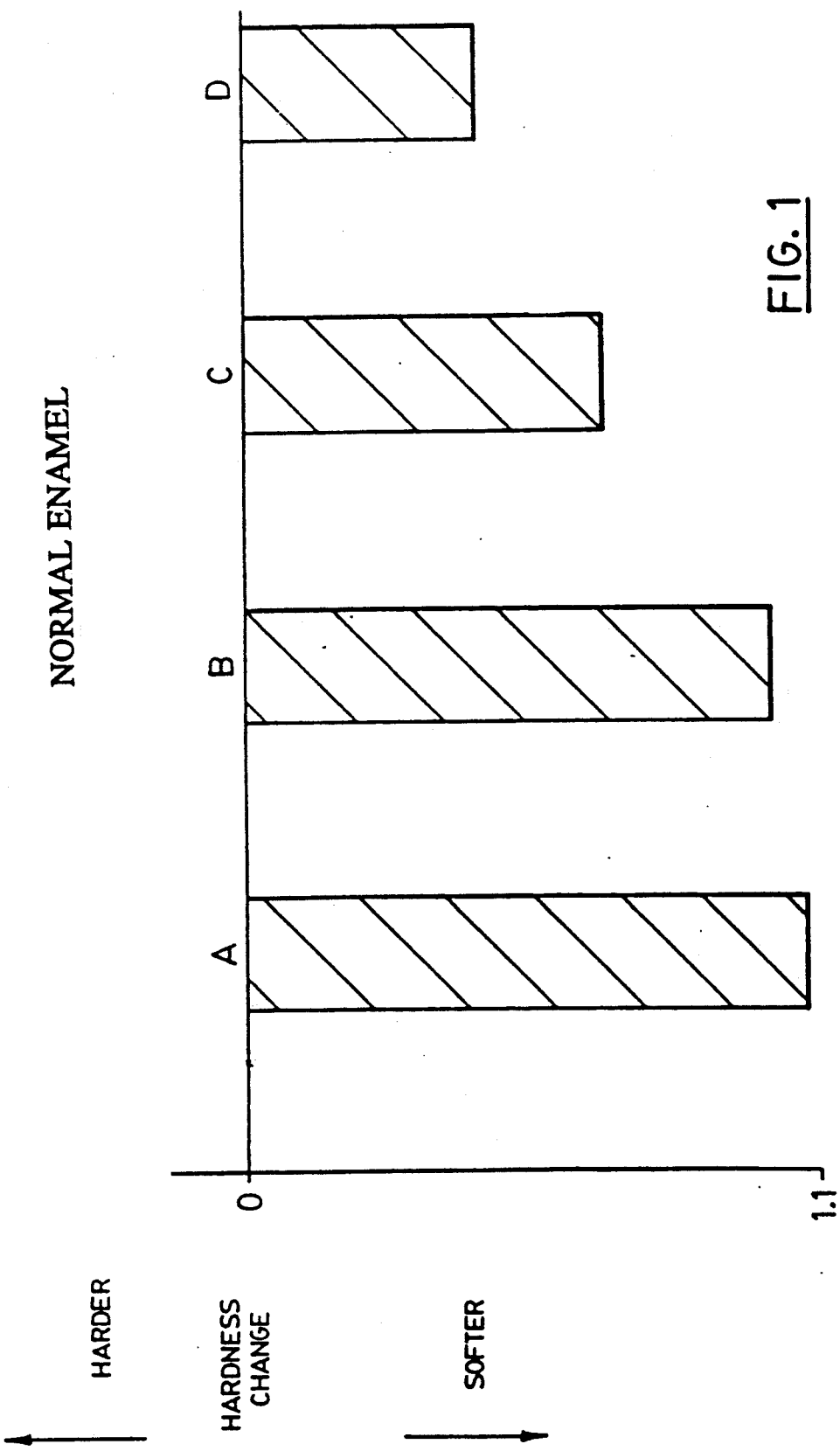

As discussed above, one basis for the present invention is the finding that cariogenic fermentable sugar compositions and sugar confectionery and chocolate made from them are rendered non-cariogenic, and do not tend to leach away mineral constituents of the tooth enamel and cause porosity of the enamel when modified by the presence of certain concentrations of fluoride, preferably also in the presence of certain concentrations of calcium, phosphate and magnesium ions. Instead, these modified compositions exert an effective remineralization action resulting in formation of fluorapatite in the tooth structure, so that the tooth is rendered more resistant to acid attack. The concentrations of fluoride necessary to achieve non-cariogenicity have been found to be in the range about 2 to about 10 ppm, based on the weight of the sugar composition or sugar containing product such as confectionery or chocolate that is consumed. Preferably in accordance with the invention sugar compositions that are to be consumed directly, and confectionery and chocolate products, comprise about 2 to about 5 ppm free fluoride. Concentrations below about 2 ppm may result in leaching away of the mineral constituents of the enamel, as evidenced by increased porosity of the enamel, and tend to result in an insufficient amount of remineralization. Concentrations above about 5 ppm result in increased risk of overdosage or fluorosis as a result of consumption of large quantities of the fluoride containing substance. Excellent non-cariogenic and remineralization results are achieved when sugar-containing confectionery or chocolate having a concentration of fluoride ion of preferably about 2 to about 5 ppm, more preferably about 2 to about 4 ppm, is consumed. Certain sugar compositions are not usually consumed as such, but are used as ingredients in the making of foodstuffs such as confections. Examples include invert sugar solutions, sucrose solutions, high fructose corn syrups and starch hydrolysates. Other sugar compositions may normally be used either as an ingredient or may be consumed substantially as such, for example as or as part of a spread, topping, icing or the like. Examples include invert syrup, honey, dextrose, fructose, refined sucrose-based sugars (such as confectioner's, fine, powdered, icing, yellow, brown and cube sugars), maple sugar, maple syrup and glucose syrup. For sugar compositions which are destined to be consumed in substantially undiluted form, preferably the content of fluoride ion is in the above-mentioned range of about 2 to about 5 ppm, more preferably about 2 to about 4 ppm, and the compositions contain effective remineralizing concentration of calcium, phosphorus and magnesium. For sugar compositions destined to be used as a confectionery or chocolate ingredient it is preferred to employ concentrations of fluoride in the range about 4 to about 10 ppm, more preferably about 4 to about 6 ppm. Sugar compositions having these concentrations of fluoride can be readily made up into final foodstuffs having a fluoride ion content in the above-mentioned preferred range of about 2 to about 5 ppm, and more preferably about 2 to about 4 ppm.

In the preferred form of the invention, sugar compositions destined for direct consumption, confectionery or chocolate contain about 100 to about 200 mg/100g each of calcium and phosphate ion calculated as elemental phosphorus, (all weights herein expressed in mg/100g being based on the weight of the composition, confectionery or chocolate). Increased degrees of remineralization are achieved when the tooth enamel is contacted with a solution having fluoride, calcium and phosphate ion therein. However, usually, human saliva naturally contains substantial concentrations of dissolved calcium and phosphate ion. Moreover, some types of confectionery and chocolate, especially milk containing products, usually have substantial contents of both calcium and phosphate. Therefore, the presence of calcium or phosphate in the sugar compositions, confectionery or chocolate is not essential, but is preferred since it ensures presence of the ions in the saliva in contact with the teeth and there is no risk of toxicity with the amounts concerned. Preferably, sugar compositions especially unrefined fluoride-containing sugar compositions destined for use as a food ingredient, and which will therefore be presented to the consumer in a diluted form, contain about 200 to about 400 mg/100g each calcium and phosphate ion, whereas compositions intended for consumption as such, including confectionery and chocolate, contain about 100 to about 200 mg/100g.

Preferably also, the sugar compositions destined for direct consumption, confectionery or chocolate comprises about 10 to about 20 mg/100g magnesium ion since such contents are believed to achieve increased degrees of remineralization as compared with compositions, confectionery or chocolate from which magnesium ion is absent. However, satisfactory, although lesser, degrees of remineralization can be achieved in the absence of magnesium ion from the saliva contacting the tooth and therefore the presence of magnesium ion is optional. Sugar compositions destined for use as a food ingredient, and which are presented to the consumer in diluted form, preferably comprise about 20 to about 40 mg/100g magnesium ion.

Some examples of sugar compositions which may be modified in accordance with the invention are listed below:

Liquid sugar solutions containing substantial quantities of monosaccharide sugar, such as invert sugar solution, invert syrup, high dextrose equivalent glucose syrups, high fructose corn syrup and honey. Typically these comprise about 20 to about 50% water, about 1 to about 40% dextrose, about 1 to about 40% fructose, and about 0 to about 80% sucrose;

Solid sugar compositions comprising substantial quantities of monosaccharide sugar, for example dried glucose syrups, crystalline fructose, and dextrose monohydrate. Typically these comprise about 90 to about 100% dextrose or fructose or a mixture thereof, and about 0 to about 10% moisture;

Solid sugar compositions comprising substantial quantities of sucrose, for example the refined sucrosebased sugars (confectioner's sugar, etc.) mentioned above and maple sugar. Typically these comprise about 85 to about 100 sucrose; 0 to about 5% water, 0 to about 10% monosaccharide sugar, 0 to about 5% ash, and 0 to about 5% non-sugar organic compounds;

Liquids containing substantial quantities of sucrose, for example sucrose solutions and maple syrup. Typically these comprise about 20 to about 50% water, about 60 to about 80% sucrose and 0 to about 50% monosaccharide sugar; and Liquid syrups containing substantial quantities of monosaccharide sugars as well as disaccharides, trisaccharides and higher saccharides, such as low conversion glucose syrup and starch hydrolysate. Typically these comprise about 15 to about 50% water, about 3 to about 50% monosaccharides, about 3 to about 50% disaccharide, about 3 to about 40% tri- to heptasaccharides and 0 to about 50% polysaccharides above heptasaccharide.

Such compositions, excluding molasses and sugars containing substantial quantities of molasses, and which are naturally deficient in fluoride ion, may be further distinguished in that their solids content comprises at least about 90% by weight carbohydrates and at least about 15% by weight fermentable carbohydrates. Typically, they comprise less than about 10% by weight, based on their solids content, of ash or other non-carbohydrates, still more typically less than about 5% ash or other non-carbohydrate.

One group of novel non-cariogenic sugar compositions in accordance with the invention comprises compositions formed by blending fluoride-containing salts, or preferably salt mixtures comprising also sources of calcium, phosphate and magnesium ions with starting material sugar compositions such as those mentioned above, which are normally deficient in or substantially free from fluoride ions. The resulting sugar compositions generally comprise, based on the total weight of the composition, 0 to about 100% monosaccharide sugar, 0 to about 100% disaccharide sugar, 0 to about 50% tri- to heptasaccharides, 0 to about 55% polysaccharides above heptasaccharide, 0 to about 50% water, and about 2 to about 10 ppm fluoride ion, with the proviso that the total weight of monosaccharide and disaccharide sugars is at least about 10% and the total weight of mono- to heptasaccharides is at least about 35% of the total weight of the composition, and that the solids content of the composition comprises at least about 90%, more preferably 95%, by weight carbohydrates and at least about 15% fermentable carbohydrates Preferably, the resulting compositions have the contents of calcium, phosphate and magnesium ions discussed above.

More generally, non-cariogenic sugar compositions may be made by blending fluoride salts, or salt mixtures additionally comprising sources of calcium, phosphate and magnesium, together with sugar compositions which may be any of those mentioned above or may be molasses-containing sugars which are deficient in fluoride ion content. In general, such methods may comprise blending a starting material sugar composition comprising, based on the total weight of the composition, 0 to about 100% monosaccharide sugar, 0 to about 100% disaccharide sugar, 0 to about 50% tri to heptasaccharides, 0 to about 55% polysaccharides above heptasaccharide and 0 to about 50% water, with the proviso that the total weight of monosaccharide and disaccharide sugars is at least 10%, the total weight of the mono to heptasaccharides is at least about 35% of the total weight of the composition, the solids content of the composition comprises at least about 15% by weight fermentable carbohydrates, and the solids content comprises at least about 40% of the total weight of the composition, with a quantity of fluoride ion containing salt providing a concentration of about 2 to about 10 ppm fluoride ion based on the total weight of the composition, to obtain a homogeneous mixture.

The amounts of fluoride salts or of salt mixtures that need to be blended into a starting material composition in order to obtain a desired non-cariogenic composition can of course be simply calculated for any desired case.

Examples of suitable fluoride ion containing salts which may be used are sodium fluoride, sodium monofluorophosphate, sodium fluorosilicate, ammonium fluorosilicate or mixtures thereof.

Examples of suitable sources of calcium phosphate and magnesium ions comprise calcium phosphate, Calcium sucrose phosphate, calcium ascorbate, calcium citrate, calcium caseinate, calcium lactate, sodium hypophosphate, sodium metaphosphate, sodium phosphate, magnesium citrate, magnesium lactate, monobasic magnesium phosphate and the like. More generally, sources of calcium, phosphorus and magnesium appropriate for food use are described in Codex Standards for Foods for Special Dietary Uses issued by the Codex Alimentarius Commission of the World Health Organization, the disclosures of which are incorporated herein by reference.

Conventional mixing equipment and techniques may be used for blending the salts, which are preferably in finely divided form, with the solid or liquid sugar compositions.

A still more preferred method for making a noncariogenic sugar composition having a predetermined content of fluoride ion in the range of about 2 to about 10 ppm comprises evaporating natural mineral water having a fluoride ion content to obtain a solid or liquid concentrate having a content of fluoride ion which is superabundant as compared with said predetermined content, and blending said concentrate with a starting material sugar composition which is deficient in fluoride ion content as compared with said predetermined content, to obtain a sugar composition having said predetermined content of fluoride ion.

Various commercially available mineral waters contain sufficient fluoride content to provide concentrates having high contents of fluoride Merely by way of example may be mentioned the following: ARKINA (trade-mark) available from Arkina S.A., Yverdon-les-bains, France, VICHY (trade-mark) from Compagnie Fermiere de Vichy, Paris, France, REDINGER (trade-mark) from Redinger Mineral-brunnen GmbH, and Co. KG, Pocking, West Germany and AQUI (trade-mark) from Hurlimann AG, Zurich, Switzerland. The total mineral content of these products, the percentage by weight fluoride based on the total solids content, and the quantity of totally dried salt mixture (in grams), superabundant in fluoride ion content, needed to impart a fluoride ion content of 2.5 ppm to 1 kg of sugar composition, confectionery or chocolate is shown in Table 1.

TABLE 1

| Product | Total minerals mg/l | Fluoride % by wt. on solids content | Salt mixture (in g) for 1 kg blend with 2.5 ppm F |
|---|---|---|---|
| Arkina | 349 | 0.32% | 0.8 |
| Vichy | 3349 | 0.15% | 1.6 |
| Redinger | 1359 | 0.29% | 0.9 |
| Aqui | 1054 | 0.30% | 0.8 |

Preferably, mineral water containing about 0.1% to about 0.4% fluoride ion, based on solids content, is concentrated to a solid concentrate by evaporating by gentle heating under reduced pressure. Since the dry solid tends to be non-homogeneous, preferably it is homogenized by reducing it to finely divided form and intermixing before blending a calculated amount with the sugar composition. Of course, such fluoride-superabundant concentrate may be blended with the starting material sugar composition during the course of making a sugar confectionery or chocolate product, but is usually more conveniently blended with a starting material sugar composition to produce a composition of predetermined fluoride content which may be used as needed or may be supplied to confectionery or chocolate manufacturers.

The conventional mixing equipment referred to above may be employed.

A further preferred method for making a noncariogenic sugar composition having a predetermined content of fluoride ion in the range about 2 to about 10 ppm, comprises blending of partially refined sugars and especially fractions containing molasses which are obtained during the refining of cane sugar, and which are naturally superabundant in fluoride ion as compared with said predetermined content, with a starting material sugar composition naturally deficient in fluoride ion as compared with said predetermined content, to obtain a blend having said predetermined content.

Molasses-containing fractions from cane sugar refining are well known to those skilled in the art and need not be described in detail. Briefly, however, in the manufacture of sugar from cane, cane juice is evaporated and crystallized to yield a primary molasses, which is separated off, and raw sugar in which form the sugar is usually exported from cane growing countries to sugar refining countries. The raw sugar consists of sugar crystals enrobed in films of molasses During the course of refining, raw sugar is washed and an affination syrup is separated. Subsequently the affination syrup is boiled, sugar is crystallized from it and a further residue of molasses obtained. Moreover, the washed raw sugar is usually dissolved, subjected to carbonation or like treatment to cause precipitation of impurities and is filtered. The residue is usually washed to obtain a further molasses-containing syrup. Various fractions are therefore formed during the course of refining which contain quantities of molasses, including the raw sugar, molasses, the affination syrup, the washed raw sugar, etc.

In addition, brown sugars are formed by blending of molasses with white refined sugar and treacles are obtained by partially inverting and filtering care molasses and therefore brown sugars and treacles also represent molasses-containing fractions of the refining process. Further, molasses, treacles and affination syrups can be dried to moisture contents of typically less than 5%, using, for example, spray drying techniques similar to those employed for the production of crystalline fructose, to yield dried solids of molasses, treacles and affination syrup. Analysis of molasses containing fractions described above has revealed that they contain quantities of fluoride ion which vary from batch to batch and which appear to depend on the geographical origin and possibly the local composition of the soil in which the cane is grown. In any event, by testing of such batches it is possible to identify and select those of superabundant fluoride ion content which may be used in a calculated amount in the above blending procedure to achieve sugar compositions of a desired and normally uniform fluoride content. The high fluoride ion content batches which may be used in the present process will preferably contain about 5 to about 60 ppm fluoride ion.

An example of a fluoride analysis method which may be used is that described in "A Method to Assay Fluoride in Foods, Beverages and Diets" Lopez, H., et al., Caries Res 1988, Vol. 22 p.210–216, the disclosure of which is incorporated herein by reference. The article discloses analysis for free (ionic) fluoride as well as for total fluoride content (including covalently bound fluorine). Examples of fluoride ion-deficient starting material sugars with which the fluoride salts, salt mixtures, or fluoride-super abundant mineral water concentrates or molasses-containing fractions may be blended include those listed above, which are normally deficient in fluoride ion, namely invert sugar solution, invert syrup, high fructose corn syrup, honey, dextrose, fructose, refined sucrose-based sugars, sucrose solution, maple sugar, maple syrup, high and low dextrose equivalent glucose syrups, starch hydrolysates, and mixtures of two or more of these In addition, the starting material may comprise molasses or a molasses-containing fraction of cane sugar, such as raw cane sugar, molasses, affination syrup, dried solids of molasses or affination syrup and the like taken from batches which on analysis are found to be fluoride ion deficient.

In order to obtain desired fluoride ion or other mineral ion contents it is necessary to add only very small amounts of the fluoride salts, salt mixture or concentrates. These additions do not substantially affect the taste or physical properties of the starting material sugars, and in particular do not substantially affect the colour, sugar content, invert content, solids content and pH of the starting material sugars and therefore the noncariogenic sugar compositions may be used in substantially the same manner and for the same purposes as the starting material sugars. For example, they may be used in simple replacement for the conventional cariogenic starting material sugars in conventional sugar confectionery and chocolate recipes, for making non-cariogenic products.

In the case in which a molasses-containing fraction is added, since molasses containing fractions are generally perceived as pleasant tasting, their addition in the necessary amounts is generally perceived as improving the flavour of and palatability of the sugar compositions and of confectionery and chocolate products made therefrom. A further advantage is that the molasses containing fractions are usually less expensive than the cariogenic starting material sugars and therefore reduce the total costs of the materials. Since the molasses containing fractions may have different characteristics of colour, sugar contents, invert contents, solid contents and pH from the starting material sugars to which they are added, these characteristics will usually need to be checked when designing a recipe for sugar confectionery and chocolate products, in order to ensure that the properties of the final confectionery and chocolate products fall within acceptable limits.

In Table 2 below is shown by way of example the approximate composition of typical fluoride superabundant molasses, as well as of a crystalline molasses obtained by drying said molasses.

TABLE 2

| | Cane Molasses | |
| | Typical Weight | |
| Constituent | Molasses | Dried Molasses |
| --- | --- | --- |
| Sucrose | 32 to 36% | 38 to 42% |
| Invert sugar | 23 to 37% | 27 to 44% |
| Ash | 2.5 to 10% | 3 to 12% |
| Water | 18 to 23% | 5% |
| Magnesium | 110 to 3800 mg/kg | 130 to 4500 mg/kg |
| Calcium | 500 to 800 mg/kg | 600 to 950 mg/kg |
| Phosphorus | 10 to 250 mg/kg | 12 to 300 mg/kg | pH is about 5.5 (typical)

For use in blending with sugar compositions which are deficient in fluoride, to achieve non-cariogenic sugar compositions, confectionery and chocolate, preferably molasses and dried molasses having fluoride contents in the range 5 to 70 mg/kg (5 to 70 ppm) are selected.

As will be noted from Table 2, a typical dried crystalline fluoride superabundant molasses fraction may typically contain about 38 to 42% by weight of sucrose, and a mixture of about 27 to 44% monosaccharide sugars (glucose plus fructose). When blended with a fluoride deficient sugar composition having a similar distribution of ingredients, the sugar content remains essentially unaffected. However, in blending with a fluoride-deficient sugar of unlike distribution of ingredients, the distribution of the sugars and other ingredients may of course be changed and this needs to be taken into account in the event that the non-cariogenic sugar composition is destined for a purpose in which the relative contents of the ingredients affects the nature or usage of products.

For example, sugar confectionery items such as hard boiled sweets (candies), hard and soft caramels, soft chewy candies, toffees, jellies, fondants, fudges, marshmallows, and nougats comprise solid supersaturated solutions of a solid sweetener (usually sucrose) together with a crystallization-retarding sugar (usually added in the form of glucose syrup) and the ratio of sucrose or other crystallizing sugar to crystallization-retarding sugar at least to some extent affects the stability and plasticity of the product. For example, glucose or fructose will serve to inhibit or retard the crystallization of sucrose and therefore when employing a non-cariogenic sugar blend of the invention in a confectionery recipe comprising sucrose and glucose or fructose the recipe may need adjustment to maintain a desired weight ratio of sucrose to glucose or fructose.

A typical analysis of a treacle is given in Table 3 below.

TABLE 3

| | Treacle |
| Constituent | Weight (Typical) |
| --- | --- |
| Sucrose | 37.5% |

TABLE 3-continued

| Treacle | |
|---|---|
| Constituent | Weight (Typical) |
| Invert sugar | 18 to 20% |
| Water | 18% |
| Magnesium | 1000 to 3500 mg/kg |
| Calcium | 5000 to 8500 mg/kg |
| Phosphorus | 320 to 600 mg/kg | pH typically 5.7.
Treacles with ionic fluoride contents of about 5 mg/kg to 70 mg/kg (5 ppm to 70 ppm) are preferably selected for making non-cariogenic sugar composition blends, sugar confectionery and chocolate.

In Table 4 below is given a typical composition for raw sugar.

TABLE 4

| Raw sugar | |
|---|---|
| Constituent | Typical Weight |
| Sucrose | 85 to 98% |
| Reducing sugar as invert sugar | 0.5 to 6% |
| Ash | 0.05 to 1.7% |
| Moisture | 0.1 to 4% |
| Magnesium | 15 to 600 mg/kg |
| Calcium | 120 to 2200 mg/kg |
| Phosphorus | 5 to 150 mg/kg |

Preferably for use in making non-cariogenic sugar compositions, sugar confectionery and chocolate, raw sugar containing about 2 to about 70 ppm (2 to 70 mg/kg) fluoride ion are selected.

The non-cariogenic sugar compositions of the invention can be employed in conventional sugar confectionery manufacturing recipes and processes, which are well known among those skilled in the art and need not be described in detail here, to produce sugar confectionery items such as noted useful above. The noncariogenic sugar composition employed in such recipes and processes may be, for example, a solid composition comprising crystallizable sugar, such as a solid sugar composition comprising substantial quantities of monosaccharide sugar, for example dried glucose syrup, crystalline fructose and dextrose monohydrate, a solid sugar compositions comprising substantial quantities of sucrose, for example the refined sucrose-based sugars mentioned earlier, dried molasses and affination syrups, and maple sugar. The non-cariogenic sugar composition employed in such recipes and processes may alternatively be, for example, a liquid sugar, such as liquid sugar solutions containing substantial quantities of monosaccharide sugar, for example invert sugar solution, invert syrup, high fructose corn syrup and honey, or liquid syrups containing substantial quantities of monosaccharide sugars as well as disaccharides, trisaccharides and higher saccharides, for example low conversion glucose syrups and starch hydrolysates. Further, both the crystallizable sugar and the liquid sugar employed in the recipes and processes may be noncariogenic sugar compositions of the invention.

Such non-cariogenic sugar compositions are preferably those made by blending the starting material sugar composition deficient in fluoride ion with a natural mineral water concentrate or with a molasses-containing fraction of raw sugar to obtain a composition having a fluoride ion content in the range about 2 to about 10 ppm.

When using molasses or treacles having high contents of fluoride ion in the manufacture of sugar confectionery, preferably recipes having constituents within the weight ranges indicated in Table 5 below are employed.

TABLE 5

| Sugar Confectionery Recipes | |
|---|---|
| Constituent | Parts by Weight |
| Beet or cane sugar | 40 to 70 |
| Water | 10 to 30 |
| Glucose syrup | 0 to 60 |
| Molasses or Treacle | 5 to 30 |

Examples of blends (identified as A to D) on Table 5 are given below, all figures being parts by weight.

TABLE 6

| Examples: | A | B | C | D |
|---|---|---|---|---|
| Constituent | | | | |
| Beet or cane sugar | 40 | 50 | 60 | 70 |
| Water | 10 | 12 | 15 | 17 |
| Glucose syrup | 55 | 47 | 40 | 30 |
| Molasses or treacle | 20 | 15 | 10 | 7 |
| Total weight of recipe: | 125 | 124 | 125 | 124 |
| Evaporation: | 25 | 24 | 25 | 24 |
| Total weight of product: | 100 | 100 | 100 | 100 |

When using raw sugar having high contents of fluoride ion in the manufacture of sugar confectionery, preferably recipes having constituents within the weight ranges indicated in Table 7 are employed.

TABLE 7

| Sugar Confectionery Recipes | |
|---|---|
| Constituent | Parts by Weight |
| Raw sugar | 10 to 90 |
| Beet or cane sugar | 0 to 75 |
| Invert sugar | 0 to 25 |
| Water | 12 to 30 |
| Glucose syrup | 0 to 60 |

Examples of blends (identified as A to D) based on Table 7 are given below all figures being parts by weight.

TABLE 8

| Examples: | A | B | C | D |
|---|---|---|---|---|
| Constituent | | | | |
| Raw sugar | 13 | 40 | 90 | 63 |
| White sugar | 50 | 40 | — | — |
| Invert sugar | — | 25 | 12 | — |
| Water | 18 | 20 | 20 | 18 |
| Glucose syrup | 40 | — | — | 40 |
| Cream of tartar | — | — | as needed | — |
| Total weight of recipe: | 126 | 125 | 122 | 125 |
| Evaporation | 26 | 25 | 22 | 25 |
| Total weight of product: | 100 | 100 | 100 | 100 |

These examples given in Tables 6 and 8 product hard candies. Recipes for producing other types of confectioneries will be apparent to those skilled in the art based on the above teachings.

Desirably said molasses, treacle or raw sugar used in the recipes of Tables 5 to 8 contains at least 6 ppm fluoride ion, preferably considerably higher.

When using molasses together with raw sugars each of which has an elevated fluoride ion content, preferably recipes as indicated in Table 9 are employed:

TABLE 9

| Constituent | Parts by Weight |
|---|---|
| Raw sugar with a minimum fluoride | 50 to 70 |

TABLE 9-continued

| Constituent | Parts by Weight |
|---|---|
| content of 1 ppm Water | 10 to 20 |
| Molasses with a minimum fluoride content of 3.5 ppm | 30 to 50 |
| Glucose syrup | 0 to 30 |

TABLE 10

Examples based on Table 9

| Example: | A | B |
|---|---|---|
| Constituent | | |
| Raw sugar | 50 | 70 |
| Water | 12 | 17 |
| Selected cane molasses | 40 | 35 |
| Glucose syrup | 18 | — |
| Total weight of recipe: | 120 | 122 |
| Evaporation: | 20 | 22 |
| Total weight of product: | 100 | 100 |

In the preferred form, the non-cariogenic sugar confectionary item is one made by cooking, in accordance with conventional sugar confectionery making processes, an aqueous solution comprising crystallizable sugar, liquid crystallization-retarding sugar, and fluoride ion which is preferably present as a result of the use of the preferred non-cariogenic sugar compositions mentioned above as an ingredient in the said aqueous solution. The aqueous solution is cooked to a solids content of about 75% to about 99%, as is conventional in sugar confectionery manufacture, and is cooled to obtain the confectionery product. The fluoride ion content of the starting material aqueous solution is such that the final product has a fluoride ion content of preferably about 2 to about 5 ppm, more preferably about 2 to about 4 ppm.

Such confectionery composition may also comprise conventional confectionery ingredients such as fats, milk products, gums, gelatin, egg white, flavourings and the like. It should be noted that the addition of milk solids and other milk products provides a means of controlling the levels of calcium and phosphorus present in the sugar confectionery product. Examples of typical sugar confectionery manufacturing recipes and processes in which non-cariogenic solid or liquid sugar composition of the invention can be employed are the recipes and processes described for manufacture of fondants, dextrose fondants, caramels, toffees, butterscotch, fudge, croquante, praline, brittles, noisette, chocolate paste, truffle paste, boiled sweets, hard candy, pulled sugar, soft-center bonbons, aerated boilings, fourres, marshmallows, nougat, soft nougat, fruit chews, jellies, gums, pastilles and turkish delight, in "Chocolate, Cocoa, and Confectionery", Minifie, B.W. Third Edition, Van Nostrand Reinhold, New York, pages 506 to 590, the disclosures of which are incorporated herein by reference.

The non-cariogenic sugar composition of the invention can also be employed in conventional chocolate manufacturing recipes and processes which are again well known to those skilled in the art and need not be described in detail. In outline, the ingredients of plain chocolate usually comprise cocoa mass, cocoa butter and sugar. Milk chocolate additionally comprises milk solids. White chocolate contains no cocoa mass and contains increased quantities of cocoa butter, together with sugar and milk solids. For forming the chocolate, the ingredients are subject to blending operations such as kneading, rolling, particle size reduction, refining, conching and tempering before casting the resulting blend to form a solid chocolate product. Usually, the products has a water content of less than about 10% by weight, more usually less than about 5% by weight. Preferably, therefore in order to achieve blends having low moisture contents, substantially dry solid non-cariogenic sugar compositions in accordance with the invention are employed in partial or total replacement of the sugar or other sweeteners conventionally employed in the usual chocolate manufacturing recipes and processes. Examples of noncariogenic compositions which may be employed include solid compositions comprising substantial quantities of monosaccharide sugar, such as dried glucose syrups, crystalline fructose and dextrose monohydrate, and solid compositions comprising substantial quantities of sucrose, for example the refined sucrose-based sugars mentioned above, dried molasses and affination syrups, and maple sugar.

Preferably, the non-cariogenic sugar compositions are those made by blending a starting material sugar composition deficient in fluoride ion with a natural mineral water concentrate of with a dried or solid molasses comprising fraction of cane sugar to obtain a composition having a fluoride ion content in the range about 2 to about 10 ppm.

In the preferred form, the non-cariogenic chocolate compositions comprise, in percentages by weight based on the total weight of the composition, about 35 to about 65% monosaccharide or disaccharide sugar, 0 to about 40% milk solids, 0 to about 20% non-cocoa butter constituents of cocoa mass, about 5 to about 55% cocoa butter and about 1 to about 5 ppm fluoride ion. Since cocoa mass typically comprises about 54% cocoa butter, in the above composition the weight of cocoa mass is expressed as the weight absent its cocoa butter (i.e. the weight of its non-cocoa butter constituents) and the weight of cocoa butter is given as total cocoa butter (i.e. added cocoa butter plus the weight of cocoa butter derived from the cocoa mass). Preferably, the sugar present in the composition is sucrose or fructose. Such composition may also comprise conventional chocolate ingredients such as flavourings, dispersing agents such as lecithin, and the like. Again, it should be noted that control of the content of milk solids provides a means of controlling the level of calcium and phosphorus in the chocolate.

Examples of typical chocolate manufacturing techniques and recipes in which non-cariogenic sugar compositions of the invention can be employed are those described in the above-mentioned Minifie text, pages 3 to 183, as well as in U.S. Pat. Nos. 2,904,438 (O'Rourke) and 4,107,347 (Burley) and Swiss patent 506,954 issued May 15, 1971 in the name VEB Maschinenfabrik Heidenau, the disclosures of all of which are incorporated herein by reference.

Naturally occurring sugar compositions and other food ingredients usually contain small contents of covalently bound fluorine. These do not normally contribute to reduction of incidence of caries but under some circumstances the compounds containing non-ionic, covalently bound fluorine atoms can be degraded in the digestive tract to result in ionic or free fluoride. To eliminate any possibility of risk of overdosage or fluorosis, all sugar compositions and products such as confectionery items and chocolate in accordance with the invention should preferably comprise a total fluorine content (including free or ionic fluoride as well as bound or covalent fluorine) of less than about 20 ppm, more preferably less than about 15 ppm. The total fluorine contents of ingredients or products can be obtained by routine analytical tests, for example as described in the Lopez et al. article referred to above.

Although the above description provides ample information to enable one skilled in the art to make and use the sugar compositions and products such as confectionery items and chocolate in accordance with the invention, for the avoidance of doubt some detailed Examples will be given.

EXAMPLES

Example 1

Blending Sodium Fluoride with Sugar

Sodium fluoride was obtained having a similar particle size to a powdered sugar (sucrose) to which the sodium fluoride was to be blended to form a good homogenous mixture. Calculation of the necessary sodium fluoride:

| Molecular weight sodium fluoride | 42 |
|---|---|
| Sodium | 23 |
| Fluoride | 19 | i.e. 45% by weight of the salt is fluoride 2.2 g of the sodium fluoride was mixed with 1000 g sugar in a vessel which was rotating about a horizontal axis. It was found that the fluoride was spread homogenously - with 1g fluoride ion/1000 g sugar as expected - throughout the mixture.

Example 2

Chocolate with 2.5 ppm Fluoride

For 2.5 ppm fluoride in 100 g chocolate, 0.25% was required of the mixture produced in Example 1. Instead of 46.25% crystallized milled sugar declared in the Standard Chocolate Recipe (see below) 46.0% of this sugar was used and 0.25% of the sugar/fluoride combination of Example 1 based on the total weight of the recipe. The small amount of the fluoride did not influence the calculation of the recipe.

| Standard Chocolate Recipe | |
|---|---|
| | percent |
| Milkpowder 25% fat | 20 |
| Cocoa mass | 13 |
| Butterfat | 1.7 |
| Cocoa butter | 18.65 |
| Crystallized milled sugar | 46.25 |
| Lecithin | 0.3 |
| Flavours | 0.1 |
| Fat: 32.5% | |

This chocolate was made following the conventional chocolate manufacturing process.

Example 3

Chocolate with 5 ppm fluoride 0.5% of the crystallized milled sugar in the Standard Chocolate Recipe (see Example 2 above) was replaced by the sugar/fluoride composition of Example 1.

Analyses of the results of Examples 2 and 3 showed acceptable fluoride ion contents of 2.6 ppm and 5.1 ppm.

Example 4

Preparation of a mineral mixture water concentrate

The water from 16 l of AQUI (trade-mark) mineral water was evaporated in a large rotary vaporizer. After two days working under a reduced pressure between 0.6 bar and 1 bar and heating at from 60–70° C. there was obtained 0.5 l water with the concentrated minerals as a residue. To avoid a crystallization in the large vessel of the vaporizer, the samples were removed and the evaporation was finished on a hot-plate.

To avoid bumping, attention had to be paid to the heating when only a small water content was left in the salt mixture. The best solution was to heat on a vessel filled with boiling water.

A white mixture was obtained with a salty taste. The first four fluoride analyses showed that the fluoride was not very homogeneously distributed. Results of between 3400 and 4000 ppm were obtained for different parts of the mixture.

To obtain a better distribution and an ideal fineness, the salt mixture was placed in a laboratory pulverizer, in which the substance was ground between marble balls. The resulting fine powder had a fluoride ion content of 3700 ppm.

Example 5

Manufacturing chocolate with minerals

Chocolate with 2.5 ppm fluoride was produced. 2.5 g of the fluoride containing fine powder of Example 4 was distributed in 497.5 g crystallized milled sugar. 13.5% of this mixture (based on the total weight of the recipe) was substituted in the Standard Chocolate Recipe of Example 2.

Similarly chocolate containing 5 ppm fluoride ion was obtained.

Example 6

Fluoride superabundant dried molasses

A molasses obtained from Lantic Sugar, Montreal, Canada under the designation LB is analyzed.

An analysis is as follows:

Fluoride ion content: 5.3 ppm; calcium ion: 470 mg/100 g; phosphate ion (calculated as phosphorus) : 169 mg/100 g.

The above molasses is dried to form a water content of 20% to a 6% water content to yield a dry crystallized molasses containing fluoride ion 6.2 ppm, 553 mg/100 g calcium, 199 mg/100 g phosphate ion (calculated as P).

To 100 parts by weight of the dried crystalline molasses is added 25 parts by weight of sucrose (100%) to yield a mixture containing 5% water, 5 ppm F, 443 mg/100 g Ca and 159 mg/100 g $PO_4$.

Example 7

Chocolate with elevated fluoride ion content (approx. 2 ppm) based on dry molasses and raw sugar

| | percent by weight |
|---|---|
| Dry molasses with a minimum fluoride ion content of 6 ppm | 32 |
| Raw sugar with a minimum fluoride ion content of 0.9 ppm | 14.25 |
| Cocoa mass | 13 |
| Milk powder 25% fat | 20 |
| Butterfat | 1.7 |
| Cocoa butter | 18.65 |

-continued

| | percent by weight |
|---|---|
| Lecithin | 0.3 |
| Flavours | 0.1 |
| Fat: 32.5% | |

The chocolate is made by conventional chocolate manufacturing processes.

Example 7

| Ingredients | Parts by Weight |
|---|---|
| Raw sugar (1) | 55 |
| Water | 13 |
| Molasses (2) | 40 |
| Glucose syrup | 15 |
| Total weight of recipe: | 123 |
| Evaporation: | 23 |
| Total weight of product: | 100 |

Notes:
(1) Raw sugar obtained from Australia analysed as follows: 1.6 mg/100 g phosphorus, 28 mg/100 g calcium, 12 mg/100 g magnesium and 0.89 ppm fluoride.
(2) Int Molasses No. 677 analysed as follows: 3.6 ppm fluoride, 660 mg/100 g calcium, 290 mg/100 g magnesium, and 39 mg/100 g phosphorus The processing is substantially the same as for a conventional hard candy, and is conducted using a conventional vacuum cooker.

In a dissolving pan the sugar is dissolved in water and the solution brought to a boil. When the temperature reaches 110° C. the glucose syrup and molasses are added. Boiling is continued until the temperature is up to 115° C. The pre-heated mix is pumped from the dissolving pan to the vacuum cookers. Cooking is continued under vacuum until a temperature of about 150° C. is reached or moisture content reduced to 1%.

The cooked syrup is poured out to an oiled table and allowed to cool until it is plastic but still soft and mobile. The edges of the mass are folded inwards and a depression made in the centre of the mass. Into this the flavour is placed. The folding and kneading are continued until the ingredients are dispersed throughout the mass. When cool enough, the batch is cut into sections and fed into machines known as Drop Rolls which press the plastic sugar into shapes.

Alternatively, the plastic sugar may be supplied to a batch roller which forms it into a rope which may be pressed into shape or chopped off into sections by a rotating knife.

A candy with 99% solids, approx. 2 ppm fluoride ion content is obtained. The product also has significant contents of calcium (at least 15 mg/100 g), of phosphate (at least 0.8 mg/100 g, calculated as P), and magnesium (at least 6.5 mg/100g).

EXAMPLE 9

The mineralizing activities of chocolate and sugar confectionery compositions of the invention were evaluated in vitro.

The mineralizing activities of the compositions were evaluated on presoftened and sound bovine enamel, by conducting microhardness tests on enamel slabs subjected to demineralizing and remineralizing cycles. The evaluation showed that minerals incorporated in the chocolate and sugar confectionery compositions improved the tooth resistance of normal enamel and of simulated enamel lesions. Numerous past studies have indicated that these changes of enamel contribute to lesser tooth susceptibility to natural caries.

Enamel slabs were cut from the labial surfaces of bovine incisors in dimensions of 3×5×3mm. After careful screening for cracks and white spots of demineralisation, the dentinal surface was flattened by grinding and the slab mounted on acrylic plastic blocks. Half of the surface of each slab was presoftened for 16 hrs in the acid buffer used for demineralisation, as described below.

The demineralizing solution was 0.01 M lactic acid in 1% aqueous carboxymethycellulose solution containing 3mM calcium (ion) and 1.8 mM phosphate ion adjusted to pH 4.0. The remineralizing solution is an aqueous solution containing 1% calcium carboxymethylcellulose and 1.8mM phosphate ion with the pH adjusted to 7.0.

The slabs were divided into groups, and the slabs in each group were exposed to a particular test product, as part of a daily demineralization - remineralization cycle as follows:

(1) 30 mins contact with demineralizing solution
(2) 30 mins contact with solution of test product, shaking every 5 mins.
(3) 4 hrs. contact with remineralizing solution
(4) 30 mins contact with solution of test product, shaking every 5 mins., and
(5) 19 hours (overnight) contact with remineralizing solution.

The slabs were rinsed for 15 secs. with deionized water after passage from one solution to the other. The solution of the test products were prepared by mixing the test products with deionized water in a blender in a proportion of 1 g of product to 3 ml of water.

The tests were continued for 5 days during which each enamel slab had a total contact time of 5 hours with its particular test product.

Changes in hardness of the enamel were determined in standard manner by determining penetration by a diamond indenter.

The following test products were evaluated:
(A)—standard milk chocolate 1 (recipe as described in Example 2 above)
(B)—standard milk chocolate II. This was a standard milk chocolate containing the following ingredients: sugar, milk powder, cocoa butter, cocoa mass, hazel nuts, milk fat, lecithin and vanillin - energy value 220 Kj/100 g (525 k cal/100 g), nutritive values: protein 7.3%, fat 32.6% and carbohydrate 55.0% including sucrose.
(C)—the same chocolate as (B) containing 2.5 ppm fluoride ion.
(D)—the same chocolate as (B) combining 5 ppm fluoride ion.
(E)—a standard sugar confectionery made from sugar (44.2 dry matter%), glucose syrup (35.0 dry matter %), vegetable fat (soya), gelatine powder, fruit powder, citric acid, flavour (lemon and lime), gum arabic, colour E 102—energy value 1667 kj/100 g (398 kcal/100 g), nutritive values: protein 2.1%, fat 8.7%, carbohydrate 80.1%.
(F)—the same sugar confectionery as (E) containing 2.5 ppm fluoride ion, together with additions of calcium, magnesium and phosphate ions.
(G)—the same sugar confectionery as (E) containing 5 ppm fluoride ion, together with additions of calcium, magnesium and phosphate ions.

Products (B) to (G) were analysed for magnesium, calcium and phosphorus contents:

TABLE 11

| Product | Magnesium | Calcium | Phosphorus (mg/100 g) |
|---------|-----------|---------|-----------------------|
| (B) | 59 | 160 | 240 |
| (C) | 68 | 210 | 210 |
| (D) | 63 | 180 | 250 |
| (E) | 3 | 3.2 | 1 |
| (F) | 23 | 213 | 188 |
| (G) | 21 | 212 | 174 |

Changes in hardness over the five days were averaged for all slabs in each group. The results are given in Table 12 below. Since hardness was determined by penetration testing, using standard units, increases in hardness are indicated by negative numbers, increases in softness by positive numbers.

TABLE 12

| | Change in Hardness | |
|---------|----------------|-------------------|
| Product | Normal enamel | Presoftened Enamel |
| Chocolate compositions | | |
| A | 1.09 | 0.02 |
| B | 1.02 | −0.35 |
| C | 0.69 | −0.48 |
| D | 0.45 | −0.58 |
| Sugar confectionery compositions | | |
| E | 7.69 | 5.26 |
| F | 1.92 | 1.66 |
| G | 1.23 | 1.06 |

Figure 2:
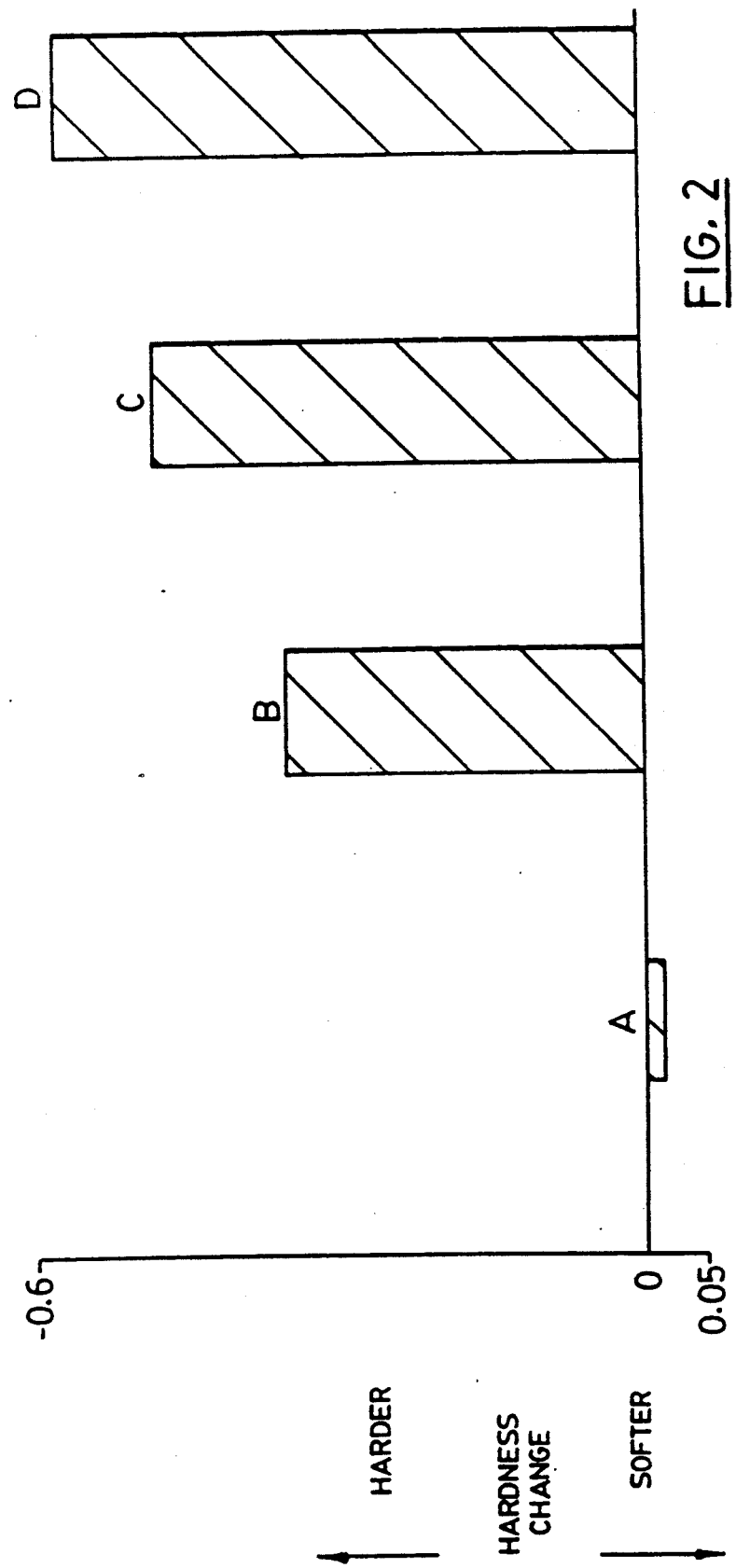
Figure 3:
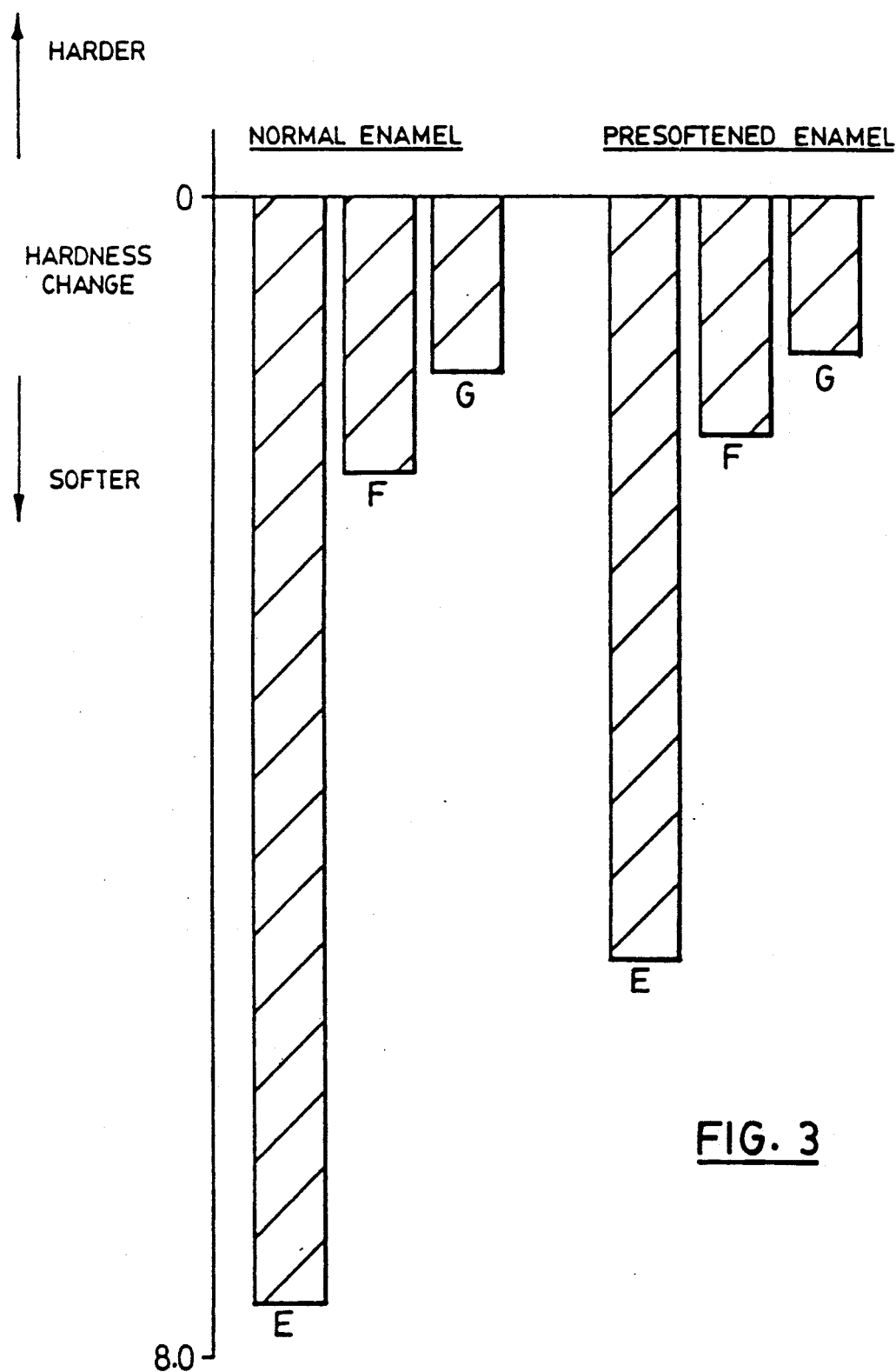

The accompanying FIGS. 1, 2 and 3 are bar charts illustrating the above results graphically.

We claim:

1. Method of making a sugar composition having a content of fluoride ion in the range about 2 to about 10 ppm comprising blending a molasses-containing fraction of cane sugar that is naturally superabundant in fluoride ion as compared with said content with a starting material sugar composition. naturally deficient in fluoride ion as compared with said content to obtain a blend having said content.

2. Method as claimed in claim 1 wherein said fluoride ion content is about 4 to about 10 ppm.

3. Method as claimed in claim 2 wherein said fluoride ion content is about 4 to about 6 ppm.

4. Method as claimed in claim 1 wherein said fraction and said starting material composition together provide a total fluorine content of less than 20 ppm.

5. Method as claimed in claim 4 wherein said fluorine content is less than 15 ppm.

6. Method as claimed in claim 1 wherein said fraction comprises raw cane sugar, molasses, affination syrup, dried solids of molasses or of affination syrup, or a blend thereof with refined sugar.

7. Method as claimed in claim 1 wherein said starting material sugar comprises, based on the total weight of the composition, 0 to about 100% monosaccharide sugar, 0 to about 100% disaccharide sugar, 0 to about 50% tri to heptasaccharides, 0 to about 55% polysaccharides above heptasaccharide and 0 to about 50% water.

8. Sugar confectionery comprising about 2 to about 5 ppm fluoride ion made by cooking an aqueous solution comprising crystallizable sugar, and liquid crystallization-regarding sugar, to a solids content of from about 75% to about 99%, and cooling the cooked solution to obtain said confectionery material wherein at least one of said crystallizable sugar and said liquid crystallization-regarding sugar has a fluoride ion content in the range about 2 to about 10 ppm and is made by blending a molasses-containing fraction of cane sugar that is naturally superabundant in fluoride ion as compared with said fluoride ion content with a starting material sugar composition naturally deficient in fluoride ion as compared with said fluoride ion content, to obtain a blend having said fluoride ion content in the range about 2 to about 10 ppm.

9. Sugar composition having a content of fluoride ion in the range about 2 to about 10 ppm, made by blending a molasses-containing fraction of cane sugar that is naturally superabundant in fluoride ion as compared with said content with a starting material sugar composition naturally deficient in fluoride ion as compared with said content to obtain a blend having said content.

10. Composition as claimed in claim 9 wherein said content is about 4 to about 10 ppm.

11. Composition as claimed in claim 10 wherein said content is about 4 to about 6 ppm.

12. Composition as claimed in claim 9 wherein said fraction and said starting material composition together provide a total fluorine content of less than 20 ppm.

13. Composition as claimed in claim 12 wherein said fluorine content is less than 15 ppm.

14. Composition as claimed in claim 9 wherein said fraction comprises a material selected from the group consisting of raw cane sugar, molasses, affination syrup, dried solids of molasses, and dried solids of affination syrup, or a blend of said material with refined sugar.

* * * * *